United States Patent
Cadours et al.

(10) Patent No.: US 7,309,382 B2
(45) Date of Patent: Dec. 18, 2007

(54) USE OF A TWO-PHASE TURBINE IN A GAS TREATING PROCESS

(75) Inventors: Renaud Cadours, Francheville (FR);
Yves Charron, Longpont sur Orge (FR); Fabrice Lecomte, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 402 days.

(21) Appl. No.: 10/954,298

(22) Filed: Oct. 1, 2004

(65) Prior Publication Data

US 2005/0098036 A1    May 12, 2005

(30) Foreign Application Priority Data

Oct. 1, 2003   (FR) .................................. 03 11498

(51) Int. Cl.
*B01D 53/14*    (2006.01)
(52) U.S. Cl. .......................................... 95/172; 95/203
(58) Field of Classification Search ................ 95/149, 95/172, 177, 203, 266, 235, 236, 174; 423/220, 423/228, 229
See application file for complete search history.

(56) References Cited

U.S. PATENT DOCUMENTS

| | | | | |
|---|---|---|---|---|
| 4,336,233 A | * | 6/1982 | Appl et al. | .................. 423/228 |
| 4,365,932 A | * | 12/1982 | Arnaudeau | ................ 415/199.5 |
| 4,553,984 A | * | 11/1985 | Volkamer et al. | ............. 95/177 |
| 4,780,115 A | | 10/1988 | Ranke | |
| 2006/0162559 A1 | * | 7/2006 | Asprion et al. | ................ 95/235 |

FOREIGN PATENT DOCUMENTS

DE    101 39 453 A1    2/2003

* cited by examiner

*Primary Examiner*—Frank M. Lawrence
(74) *Attorney, Agent, or Firm*—Antonelli, Terry, Stout & Kraus, LLP.

(57) ABSTRACT

The gas to be processed, flowing in through line 10, contains impurities. This gas is contacted in column C1 with a solvent flowing in through line 18. The scrubbed gas is discharged through line 19. The impurity-laden solvent recovered through line 12 is regenerated by expansion, then by distillation in column C2. The invention proposes carrying out expansion by means of two-phase turbines T1 and T2.

6 Claims, 2 Drawing Sheets

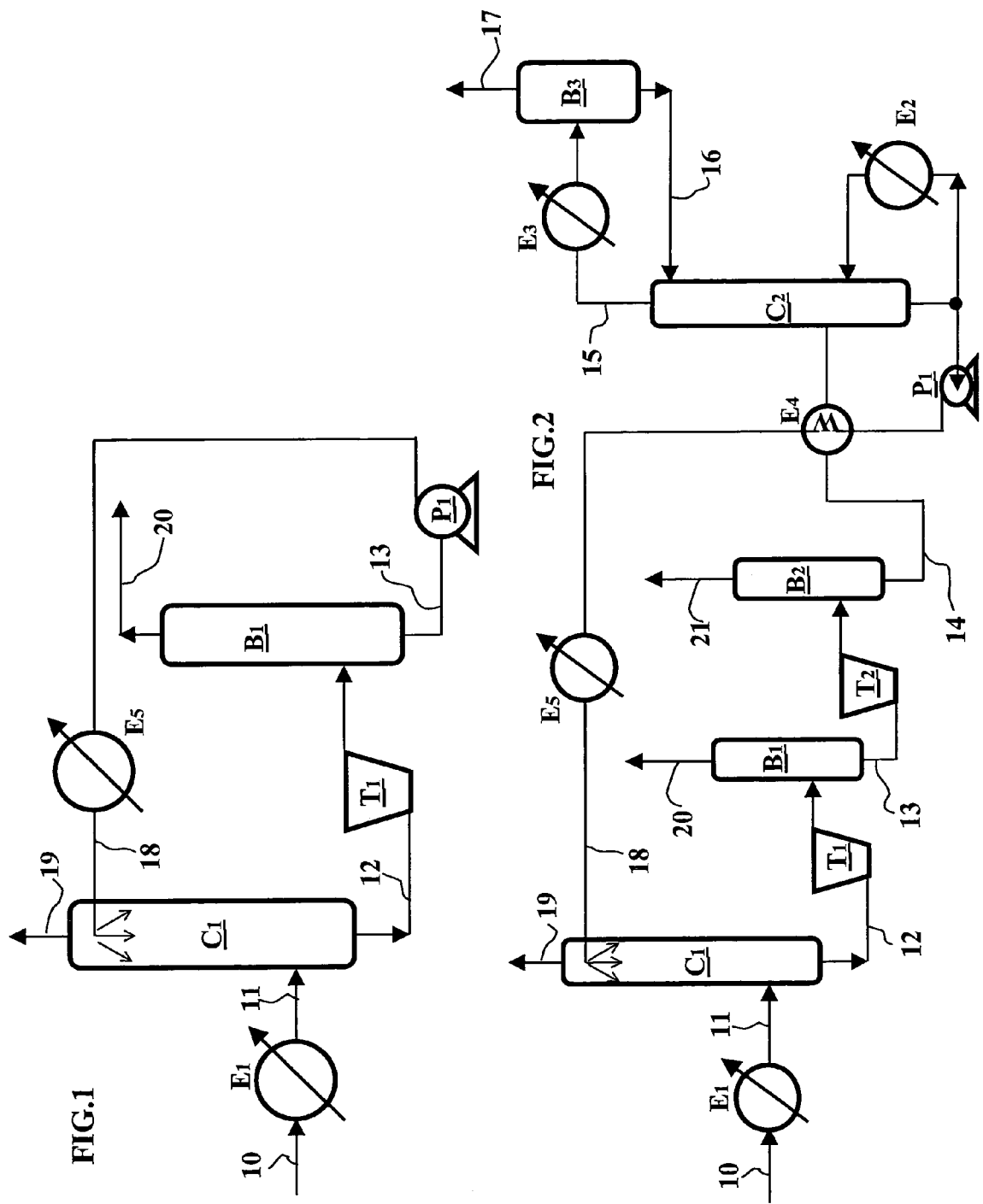

USE OF A TWO-PHASE TURBINE IN A GAS TREATING PROCESS

FIELD OF THE INVENTION

The invention relates to the field of gas treating processes using a solvent. It proposes using a two-phase turbine to regenerate the solvent used for processing a gas.

BACKGROUND OF THE INVENTION

Processing of a gas, for example natural gas, synthesis gas, combustion gas, gas from integrated combined cycles, generally involves removal of impurities such as nitrogen ($N_2$), ammonia ($NH_3$), and acid compounds such as carbon dioxide ($CO_2$), hydrogen sulfide ($H_2S$), sulfur dioxide ($SO_2$), COS, $CS_2$ and mercaptans. These impurities are present in various proportions depending on the origin of the gas. In the case of natural gas, $CO_2$ and $H_2S$ can be present as traces, some ppm, but they can also represent a quite significant proportion of the raw gas, up to 70% by volume. Other impurities such as COS, $CS_2$ and mercaptans can also be encountered, generally a few thousand ppm.

According to the initial proportions of impurities in the gas to be processed, and also according to the specifications required for the processed gas, various scrubbing processes are used. The most commonly used processes use solvents. These solvents can be of physical or chemical nature. Solvents of physical nature are based on the preferred solubility of the impurities in the solvent, and are therefore favoured by the high partial pressures of the impurities in the gas to be processed. Solvents of chemical nature are ideally used to reach the strictest specifications for the processed gas, by chemical consumption of the species absorbed by reaction with an active agent contained in the absorption solvent. There are also solvents of hybrid nature consisting of a mixture of physical and chemical solvents so as to enjoy the advantages of these two solvents.

Whatever the origin of the gaseous effluent to be processed, the purification loop generally consists of an impurities collection stage using a solvent and of a solvent regeneration stage. The regeneration stage is conditioned by the nature of the solvent used. In the case of a solvent involving a chemical reaction, a thermal regeneration is generally used to obtain a sufficient solvent purity allowing the desired specifications to be reached. Thermal regeneration can be preceded by regeneration by expansion in order to limit the energy required for thermal regeneration. In the case of a solvent of hybrid or physical nature, regeneration is essentially carried out by expansion, possibly completed by a thermal regeneration stage.

The invention proposes improving the regeneration by expansion of a solvent by carrying out an expansion in a two-phase turbine.

SUMMARY OF THE INVENTION

In general terms, the present invention relates to a treating process for a gas comprising at last one of the impurities $CO_2$, $H_2S$, $SO_2$, COS, $CS_2$, mercaptans, $N_2$ and $NH_3$. The following stages are carried out:

a) contacting the gas with a solvent absorbing the impurities so as to obtain an impurity-laden solvent and a scrubbed gas, b) expanding the impurity-laden solvent through a two-phase turbine so as to release an amount of impurities in gaseous form and to obtain an impurity-depleted solvent, c) separating said amount of impurities from said impurity-depleted solvent.

According to the invention, the two-phase turbine can be a rotodynamic turbine, for example, comprising at least one impeller and at least one diffuser.

The method according to the invention can comprise the following stages:

d) expanding said impurity-depleted solvent through a second two-phase turbine so as to release a second amount of impurities in gaseous form and to obtain an expanded solvent, e) separating said second amount of impurities from said expanded solvent.

According to the invention, the two-phase turbine used in stage b) can comprise at least one impeller and at least one diffuser, the second two-phase turbine used in stage d) can comprise at least one impeller and at least one diffuser, and the impellers of said turbines can be mounted on a single shaft.

The method according to the invention can comprise the following stages:

f) distilling said impurity-depleted solvent so as to separate the impurities from the solvent, g) recycling the distilled solvent to stage a).

According to the invention, stage a) can be carried out at a pressure ranging between 1 MPa abs. and 15 MPa abs., preferably between 3 MPa abs. and 10 MPa abs., and in stage b) the solvent can be expanded to a pressure ranging between 0.1 MPa abs. and 3 MPa abs.

The solvent used in the method according to the invention can be a solvent of physical nature.

BRIEF DESCRIPTION OF THE FIGURES

Other features and advantages of the invention will be clear from reading the description hereafter of non limitative embodiment examples, with reference to the accompanying drawings wherein FIG. 1 diagrammatically shows a method according to the invention, FIG. 2 diagrammatically shows a variant of the method according to the invention.

DETAILED DESCRIPTION

Figure 3:
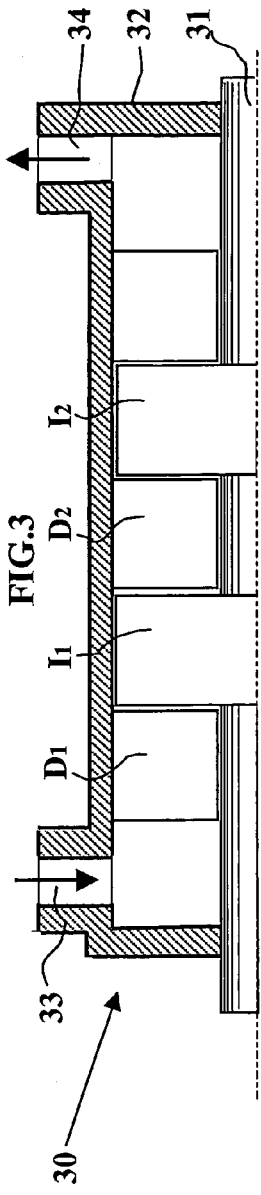
FIGS. 3 and 4 show a two-phase turbine used in the method according to the invention.

In FIG. 1, the gas to be processed flowing in through line 10 comprises impurities such as $CO_2$, $H_2S$, $SO_2$, COS, $CS_2$, mercaptans, $N_2$ and $NH_3$. This gas can be a natural gas comprising notably hydrocarbons, a synthesis gas comprising notably hydrogen and carbon monoxide, a combustion gas possibly resulting from combined cycles, comprising notably nitrogen and oxygen. The gas is possibly cooled in heat exchanger E1, then fed through line 11 into absorption column C1. The gas is then contacted with a liquid solvent fed through line 18 into the top of column C1. The solvent absorbs the impurities contained in the gas. The scrubbed gas, i.e. depleted in impurities, is discharged at the top of column C1 through line 19.

The solvent can be of physical or chemical nature. For example, the solvent can be an alcohol, a glycol, a heavy hydrocarbon such as propylene carbonate, a potassium carbonate, a morpholine, a polyethylene glycol dimethylether, an amine such as an alkanolamine or an alkylamine. The solvent can also be a mixture of two or more aforementioned solvents.

The liquid impurity-laden solvent is discharged from column C1 through line 12, then expanded in two-phase turbine T1. The expanded solvent is fed into separating drum B1. The impurities released in gaseous form upon expansion are discharged at the top of drum B1 through line 20.

The liquid solvent recovered at the bottom of drum B1 through line 13 is depleted in impurities. It can be recompressed by pump P1, then fed through line 18 to the top of column C1. Expansion in turbine T1 has the advantage of cooling the solvent. However, if the regenerated solvent is not sufficiently cold, it can be supercooled by heat exchanger E5 prior to being fed into column C1.

FIG. 2 shows a variant of the method described in connection with FIG. 1. The stages carried out in exchanger E1, column C1, turbine T1 and drum B1 of FIG. 2 are identical to the stages carried out in the same elements of FIG. 1.

In FIG. 2, the liquid solvent coming from the bottom of drum B1 through line 13 is expanded in two-phase turbine T2. The expanded solvent is fed into separating drum B2. The impurities released in form of gas upon expansion are discharged at the top of drum B2 through line 21. Expansion in turbine T2 is optional, which means that, in the method described in connection with FIG. 2, elements T2, B2 and 21 can be removed and line 13 can be directly connected to line 14.

The liquid solvent recovered at the bottom of drum B2 through line 14 is depleted in impurities. It is cooled in heat exchanger E4, then fed into distillation column C2. The distillation column allows to carry out advanced regeneration of the solvent, i.e. to reduce the proportion of impurities in the solvent to a very low level, in any case to a lower level than that obtained by means of regeneration by expansion. Reboiler E2 provides the heat required for distillation in column C2. The gas phase discharged at the top of column C2 through line 15 mainly comprises impurities. This gas phase is partly condensed by cooling in heat exchanger E3, then fed into separating drum B3. A gas phase mainly comprising impurities is discharged from drum B3 through line 17. The condensates recovered at the bottom of drum B3 are injected through line 16 to the top of column C2 as reflux.

The regenerated solvent available at the bottom of column C2 is pumped by pump P1, cooled in heat exchanger E4, then injected to the top of absorption column C1. Expansion in turbines T1 and T2 has the advantage of cooling the solvent. Thus, the solvent obtained after expansion constitutes a coolant for cooling the regenerated solvent intended to be fed into column C1. However, if the regenerated solvent is not sufficiently cold, it can be supercooled by heat exchanger E5 prior to being fed into column C1.

In the methods described in connection with FIGS. 1 and 2, expansion of the solvent by means of two-phase turbines T1 and T2 affords the following advantages.

The pressure decrease allows to release the impurities in gaseous form.

Expansion of the solvent by means of a turbine is accompanied by a temperature reduction of the solvent. In fact, expansion by means of a turbine is close to an isentropic expansion. This cold generation allows to compensate for the temperature increase in the absorption column during the absorption reaction, which is generally exothermic. Thus, the method according to the invention requires no exterior cooling source and it is therefore an autothermal process.

For example, when the solvent is regenerated only by expansion, the solvent obtained after expansion requires no or only a low temperature reduction before injection of the solvent into the absorption column. Similarly, when the solvent is regenerated by expansion and by distillation, the solvent obtained at low temperature after expansion constitutes a coolant allowing to cool the high-temperature regenerated solvent from the distillation column.

The expansion energy can be recovered at the shaft of the two-phase turbine. This expansion energy can be re-used for compression of the solvent by pump P1 and/or recompression of the impurities in gaseous form circulating in lines 20 and 21 at the outlet of drums B1 and B2.

Furthermore, the two-phase turbines used in the method according to the invention accept gas freeing, in large amounts, of the impurities contained in the solvent to be regenerated.

In the present description, a two-phase turbine is a turbine designed to expand a fluid whose proportion by volume of gas can be above 5%. Two-phase turbines T1 and T2 can be rotodynamic type turbines comprising impellers and diffusers, for example a machine as described in one of the following patents: FR-2,333,139, FR-2,471,501 and FR-2,665,224.

FIG. 3 shows a two-phase turbine 30 which comprises two expansion stages arranged in housing 32. The first stage consists of the diffuser D1 and impeller I1 pair, the second stage consists of the diffuser D2 and impeller I2 pair. Impellers I1 and I2 are mounted on rotor 31 which is mobile in rotation in housing 32 of the turbine. Diffusers D1 and D2 are secured to housing 32. The fluid to be expanded is fed into the housing through opening 33, it successively circulates between the blades of D1, I1, D2 and I2, then the fluid expanded by turbine 30 is discharged through opening 34. Diffusers D1 and D2 allow to convert the potential energy of the fluid to kinetic energy. The moment change exerted by the fluid allows an energy transfer from the fluid to the rotor by means of the impellers.

Figure 4:
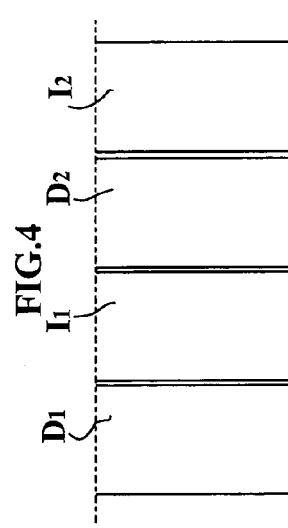

FIG. 4 is a developed view of impellers I1 and I2 and of diffusers D1 and D2. Reference numbers 40 and 41 relate to the blades of diffusers D1 and D2, reference numbers 42 and 43 relate to the blades of impellers I1 and I2.

Figure 5:
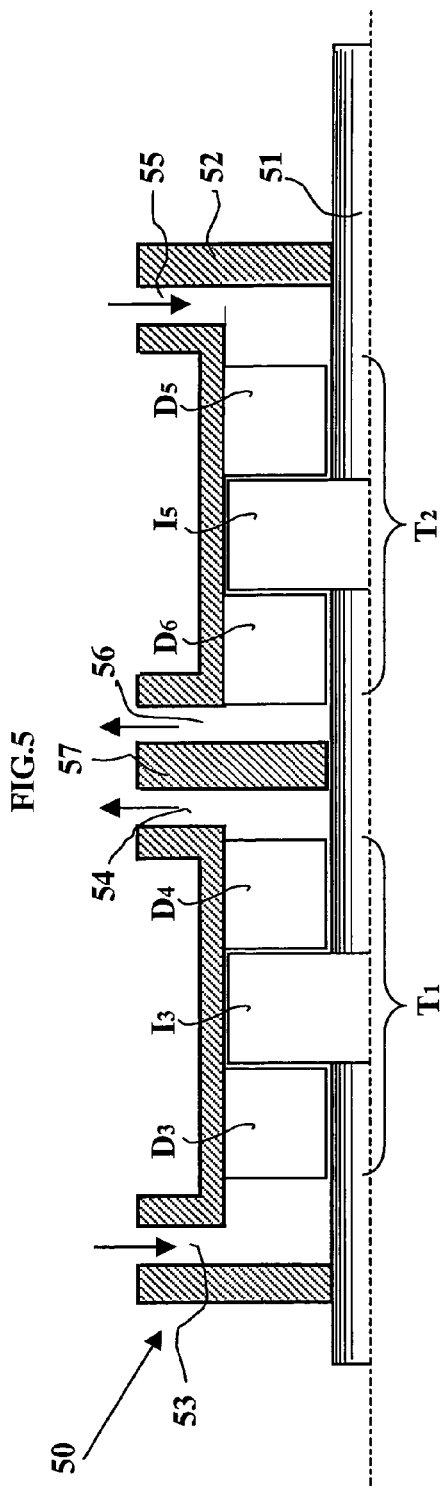
FIG. 5 shows a second two-phase turbine used in the method according to the invention.

Turbines T1 and T2 can be integrated in a single machine 50 as shown in FIG. 5. Turbines T1 and T2 are arranged in housing 52. Turbine T1 is made up of diffusers D3 and D4, and impeller I3, and turbine T2 is made up of diffusers D5 and D6, and impeller I5. Impellers I3 and I5 are mounted on the same shaft 51 mounted mobile in rotation in housing 52. Separation and sealing device 57 allows to insulate turbine T1 from turbine T2. The fluid flows into turbine T1 through orifice 53, it successively circulates between the blades of D3, I3 and D4, then it is discharged through orifice 54. The fluid then enters turbine T2 through orifice 55, it successively circulates between the blades of D5, I5 and D6, then it is discharged through orifice 56.

The invention claimed is:

1. A method of processing a gas comprising at least one of the impurities $CO_2$, $H_2S$, $SO_2$ COS, $CS_2$, mercaptans, $N_2$ and $NH_3$, wherein the following stages are carried out:
   a) contacting the gas with a solvent absorbing the impurities so as to obtain an impurity-laden solvent and a scrubbed gas,
   b) expanding the impurity-laden solvent through a two-phase turbine so as to release an amount of impurities in gaseous form and to obtain an impurity-depleted solvent, c) separating said amount of impurities from said impurity-depleted solvent, d) expanding said impurity-depleted solvent through a second two-phase turbine so as to release a second amount of impurities in gaseous form and to obtain an expanded solvent, and e) separating said second amount of impurities from said expanded solvent.

2. A method as claimed in claim 1, wherein the two-phase turbine used in stage b) comprises at least one impeller and at least one diffuser, the second two-phase turbine used in stage d) comprises at least one impeller and at least one diffuser, and the impellers of said turbines are mounted on a single shaft.

3. A method as claimed in claim 1, wherein the following stages are carried out:

f) distilling said impurity-depleted solvent so as to separate the impurities from the solvent, g) recycling the distilled solvent to stage a).

4. A method as claimed in claim 1 wherein stage a) is carried out at a pressure ranging between 1 MPa abs. and 15 MPa abs. and wherein, in stage b), the solvent is expanded to a pressure ranging between 0.1 MPa abs. and 3 MPa abs.

5. A method as claimed in claim 1, wherein the solvent is a solvent of physical nature.

6. A method as claimed in claim 1, wherein the two-phase turbine used in stage a) comprises a rotor mounted for rotation in a housing, at least one impeller mounted on the rotor, and at least one diffuser mounted in the housing.

* * * * *